US007847244B2

(12) United States Patent
Venter et al.

(10) Patent No.: US 7,847,244 B2
(45) Date of Patent: Dec. 7, 2010

(54) ENCLOSED DESORPTION ELECTROSPRAY IONIZATION

(75) Inventors: Andre Venter, West Lafayette, IN (US); Robert Graham Cooks, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 396 days.

(21) Appl. No.: 12/005,593

(22) Filed: Dec. 27, 2007

(65) Prior Publication Data

US 2008/0156985 A1 Jul. 3, 2008

Related U.S. Application Data

(60) Provisional application No. 60/877,582, filed on Dec. 28, 2006, provisional application No. 60/930,602, filed on May 17, 2007.

(51) Int. Cl.
*B01D 59/44* (2006.01)

(52) U.S. Cl. ...................................................... 250/288

(58) Field of Classification Search ................. 250/288, 250/423 R, 424, 425
See application file for complete search history.

(56) References Cited

U.S. PATENT DOCUMENTS

| | | | | |
|---|---|---|---|---|
| 7,335,897 | B2 * | 2/2008 | Takats et al. | 250/425 |
| 2008/0042055 | A1 * | 2/2008 | Baykut et al. | 250/287 |
| 2008/0173809 | A1 * | 7/2008 | Wu | 250/283 |

OTHER PUBLICATIONS

Takats et al., 2004, Science 306(5695): 471-473.

* cited by examiner

*Primary Examiner*—Kiet T Nguyen
(74) *Attorney, Agent, or Firm*—Sonia K. Guterman; Lawson & Weitzen, LLP

(57) ABSTRACT

An improvement to Desorption Electrospray Ionization (DESI), the process of creating ions directly from sample surfaces for mass spectrometric (MS) analysis by impinging a liquid spray onto the surface. The improvement is brought about by enclosing the spray and sample surface and MS-inlet capillary in a pressure tight enclosure. The invention includes methods of sampling a larger or smaller area of surface by impacting and collecting droplets from such an area. The invention allows DESI to be performed without need for careful control of the geometry of the sprayer and MS-inlet capillary positions and angles relative to the sample surface.

16 Claims, 11 Drawing Sheets

ENCLOSED DESORPTION ELECTROSPRAY IONIZATION

RELATED APPLICATIONS

The present application claims the benefit of provisional application Ser. No. 60/877,582 filed in the U.S. Patent and Trademark Office on Dec. 28, 2006, and provisional application Ser. No. 60/930,602 filed in the U.S. Patent and Trademark Office on May 17, 2007.

GOVERNMENT SUPPORT

The U.S. Government has a paid-up license in this invention and the right in limited circumstances to require the patent owner to license others on reasonable terms as provided for by the terms of Grant No. BAA ONR 04-024 awarded by the Office of Naval Research.

TECHNICAL FIELD

The invention generally relates to an improvement to Desorption Electrospray Ionization (DESI), the process of creating ions directly from sample surfaces for analysis by impinging an electrically charged liquid spray onto the surface. The analysis can be by a mass spectrometer, ion mobility analyzer or other type of ion analyzer and related processing system.

BACKGROUND

DESI is used in mass spectrometry to obtain ions directly from sample surfaces. For samples at or near atmospheric pressure, a charged aqueous solvent mixture or other fluid is electrosprayed with pneumatic assistance and directed at a sample surface. The spray interacts with analytes on the surface and produces ions (sometimes the ions are already present in the sample), some of which are adsorbed by the solvent droplets, sampled into the mass spectrometer, and analyzed for their mass to charge ratio. With the typical DESI source the signal intensity depends strongly on geometric factors including the angle and distance of the sprayer to the surface and those between the surface and the mass spectrometer inlet. The Optimum geometry is also dependent on the analyte and the sample surface. This requires re-optimizing of various parameters between different samples and causes uncertainties when comparing relative intensities of analytes obtained from different samples. As is the case for electrospray ionization (ESI), only a small fraction of the divergent analyte containing spray is sampled into the mass spectrometer largely because of inefficient collection at the atmospheric pressure interface. In DESI, droplet scattering occurs at the surface and this further reduces the droplet sampling efficiency. The sample is typically open to the atmosphere of the laboratory during DESI and other ambient ionization methods, and this allows for easy manipulation of the surface during analysis. Concurrently, this open geometry potentially introduces solvent vapors into the laboratory atmosphere as well as sample components such as chemicals and biological materials when these are present on the surface. The high nebulizing gas pressure used in DESI means that in the case of biological samples, aerosols may be produced during the ionization process.

Moving mass spectrometers out of the lab into the field requires two key advances: 1) removal of arduous sample preparation steps, and 2) producing mass spectrometers that are small, portable and cheap. DESI is a giant leap towards removing sample preparation from mass spectrometric analysis. Reducing the size of mass spectrometers is hampered by the requirement for mass spectrometry to be performed in vacuum. Coupling DESI to a mass spectrometer requires an atmospheric pressure—vacuum interface with a large pumping capacity to deal with the fact that the vacuum system needs to combat the continuous influx of air. Thus, DESI and mini-mass spectrometers are not natural partners.

Most atmospheric pressure desorption ionization experiments depend on optimization of instrumental geometry as well as requiring chemical preparation steps. For example, atmospheric pressure matrix assisted laser desorption requires meticulous care in matrix deposition. Atmospheric pressure matrix free laser desorption ionization has not yet been reported, although electrospray assisted laser desorption ionization will potentially make this possible. The liquid micro-junction probe/ESI emitter depends heavily on the maintenance of an optimum liquid junction thickness requiring a skilled operator or computer control. In DESI too, although sample preparation is generally not used, signal intensity depends on such chemical factors such as the spray solvent and surface polarities and the analyte identity. Signal intensity also depends on physical factors such as the sizes and velocities of incident droplets, sample surface roughness and porosity and, most significantly, on various geometric factors such as the spray angle, the collection angle and the distances of the sprayer and collecting capillaries from the sample surface. DESI has been implemented using various mass spectrometers including triple quadrupoles and linear ion traps, quadrupole-time-of-flight (QTOF) instruments, ion mobility/TOF and ion mobility/QTOF hybrids, and Fourier transform ion cyclotron resonance instruments, among others. While optimization depends on the particular instrument and DESI source used, certain trends are usually observed.

SUMMARY

The invention described below addresses the above issue by reducing the required pumping capacity of the vacuum system and allowing smaller vacuum components to be used. An enclosed desorption electrospray ionization source of the present invention reduces the dependence of the DESI-MS ion signal on geometric factors, which removes the need to fine-tune the geometric parameters between samples and for different analytes and surfaces. The new-source enhances transport of ions produced during or after droplet—surface interaction. The new source removes the need for optimization of spray angles and facilitates the sampling of a large area. The new source also increases signal stability and improves the quantitative DESI. The enclosed geometry-independent DESI source of the present invention provides a simple way of achieving a separation of the sample environment and the lab environment, thereby making the process safer for the operator. These advantages are achieved by improvements in the DESI source design.

In certain embodiments, the source can be enclosed in a pressure tight quick connect-disconnect enclosure. This allows for pneumatic effects to aid transport of the secondary spray after impact with the sample surface into the mass spectrometer. The standard vacuum system of the atmospheric pressure interface of the mass spectrometer usually pulls in air, ions and droplets from the ambient laboratory air and the electrosprayed sample solution into the heated capillary interface, sampling perhaps less than 1% of the spray volume impinging on the surface. By enclosing the source, the secondary spray can be confined to a reduced volume directly above and surrounding the analyte and a much larger percentage of the spray can be sampled. The enclosure can provide for fixed spatial relationships between the sprayer, surface and sampling capillary, thus leading to improved ionization efficiency and ease of use that can yield data that are largely independent of the spray and collection capillary geometries.

In other embodiments, the surface area that is interrogated by the spray has a well defined size. This may be large or small depending on the application. Initial efforts are aimed at increasing the DESI sampling area. This goal can be obtained through various means such as incorporating multiple sprayers that are sampled into a single spray uptake inlet. This inlet can be directly coupled through a pressure tight union to the inlet capillary of the mass spectrometer. Large area surface coverage can further be achieved by creating a turbulent gas flow and spray movement inside the enclosure. This can be achieved by the combined effect of the nebulizing gas and vacuum suction, or due to the pneumatic effects of multiple sprayers in the enclosed sampling device, or by mechanical means. This ensures a wide coverage of the surface and inbound spray arrives at the sample surface at multiple angles and positions.

By enclosing the spray in a small, pressure-tight chamber, all ions and vapors produced by the interaction of the spray with the surface can be drawn into the vacuum system of the mass spectrometer and vented through the exhaust of the vacuum pump, potentially increasing the signal strength and simultaneously protecting the analyst from the spray and surface materials including solvent vapors, chemicals and biological materials. The small, pressure-tight enclosure provides the additional advantage that transport into the atmospheric pressure interface of the mass spectrometer is aerodynamically assisted by the suction of the vacuum system, the mass flow of the expanding nebulizing gas and the evaporating solvent. After colliding with the surface, droplets as well as desorbed ions and neutral molecules can be sampled into the collection capillary, irrespective of the combination of spray and collection capillary angles. The collection capillary can be connected to a mass spectrometer, ion mobility analyzer or other type of ion analyzer and related processing system.

The above, as well as other advantages of the present invention, will become readily apparent to those skilled in the art from the following detailed description of embodiments when considered in the light of the accompanying drawings. The components in the figures are not necessarily to scale, emphasis instead being placed upon illustrating the principles of the invention.

DESCRIPTION OF THE DRAWINGS

FIG. 6A is a graph of Bombesin from smooth glass by Enclosed DESI.

FIG. 6B is a graph of Bombesin on smooth glass by conventional DESI.

FIG. 6C is a graph of an enclosed DESI analysis of Cytochrome c on PTFE.

FIG. 6D is a graph of a conventional DESI analysis of Cytochrome c on PTFE.

FIG. 7A shows the analysis of the surface of a Claritin tablet showing protonated $[M+H]^+$ and sodiated $[M+Na]^+$ Loratidine and its sodiated dimer $[2M+Na]^+$.

FIG. 7B shows the analysis of narcotics showing protonated morphine ($[M+H]^+$ m/z 286) and codeine ($[C+H]^+$ m/z 300) as well as sodiated and potassiated monomers and dimers.

DESCRIPTION OF EMBODIMENTS

Figure 1A:
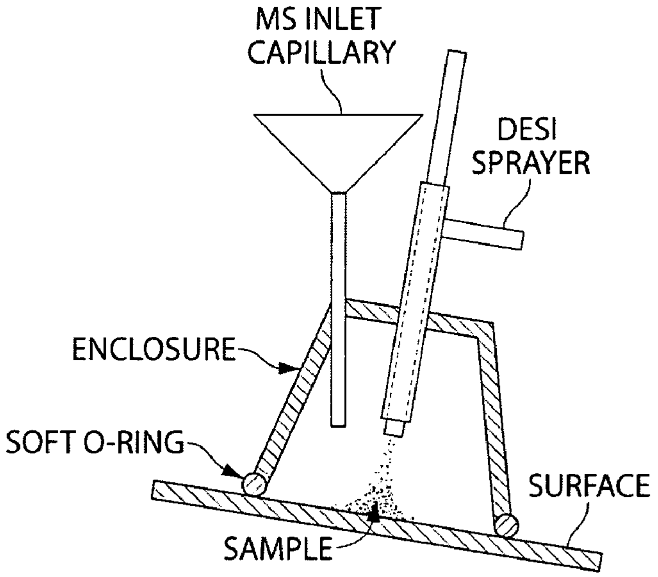
FIG. 1A is a schematic elevation view of a first enclosed desorption electrospray ionization source.
Figure 1B:
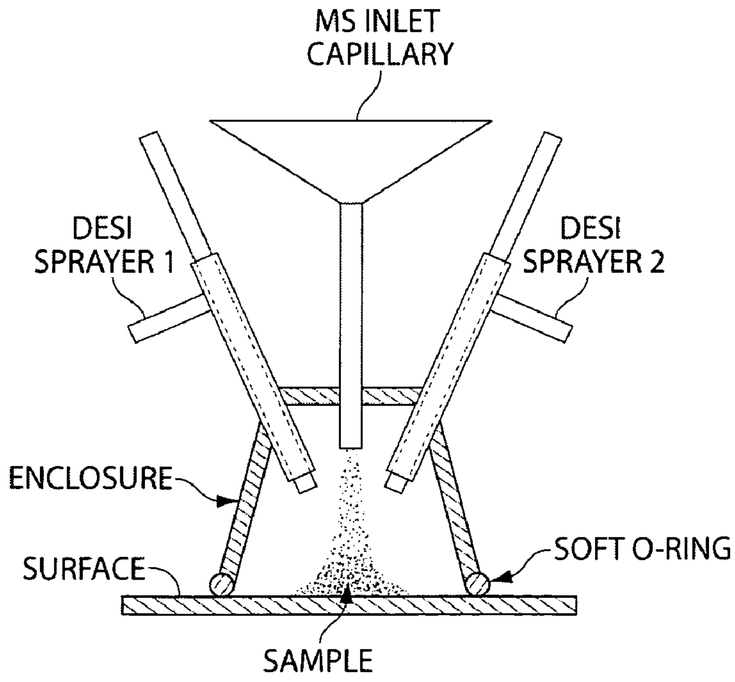
FIG. 1B is a schematic elevation view of a geometry independent enclosed desorption electrospray ionization source with multiple sprayers to cover a large surface area.
Figure 1C:
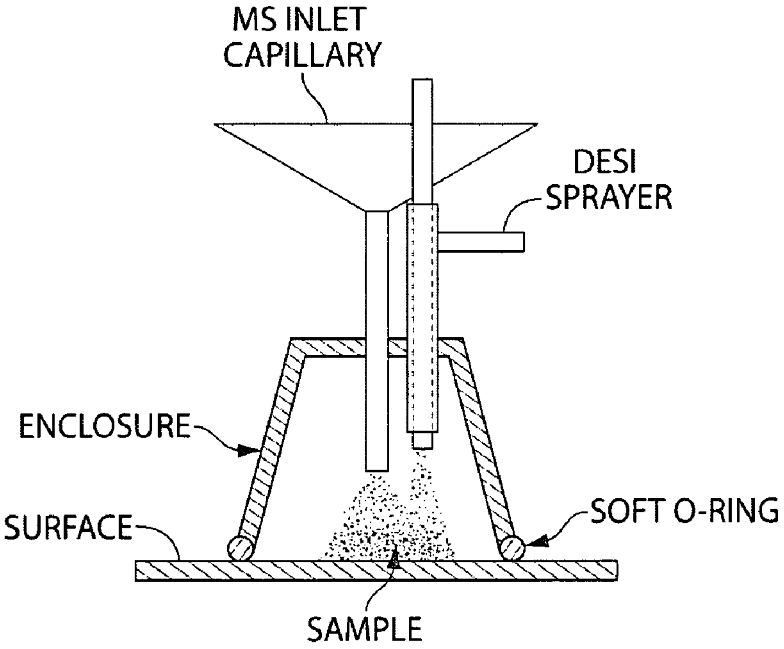
FIG. 1C is a schematic elevation view of an enclosed desorption electrospray ionization source where the spray capillary and take-up capillary are parallel to each other.

FIGS. 1A through 1F show possible GI-DESI source configurations. FIG. 1A is a diagram of the set up used to generate the data presented in this disclosure. FIG. 1A shows a sprayer that is directed at a normal (90°) angle to the surface and a take-off (collection angle) that is about an 80° angle with respect to the surface. The enclosure for a first device was constructed from the sawed-off neck and cap of a 60 ml Nalgene HDPE narrow mouth bottle. A DESI sprayer constructed with a Swagelok® T-piece as described elsewhere (Science, 5695 (2004) 471-473) was mounted into the cap. This was achieved by drilling a hole into the cap and tapping the T-piece through the hole before making the capillary connections. A second hole was drilled into the cap that was the same size as the take-off capillary. The take-off capillary fitted snugly through the hole and extended all the way down to about 1 mm above the sample surface. The sprayer was positioned about 3 mm above the surface. The other end of the take-off capillary was connected directly to the capillary inlet that forms part of the commercial atmospheric pressure interface of the Thermo-Fisher LTQ® mass spectrometer with a heat-shrink polymer sleeve. A photograph of the first actual device is shown in FIG. 2. The enclosure was fixed onto a sample-containing glass slide and an air tight seal was obtained by compressing a Viton® O-ring between the neck of the bottle and the slide. Compression was applied with two small binder clips.

Typical DESI spray parameters were applied. A spray voltage of 5 kV was applied to the stainless steel needle of a 250 uL glass syringe. A solution of 50% methanol-water was delivered to the sprayer at 5 ul/min controlled with a syringe pump. The nebulizing gas pressure was controlled at 150 psi. It should be noted that both the spray and collection angles are different from the other angles in typical DESI experiments, in which an inbound spray angle of about 40° to about 70° and a take off collection angle of about less than 10° are normally used. This demonstrates the resilience of the present design to changes in spray geometries.

Figure 3A:
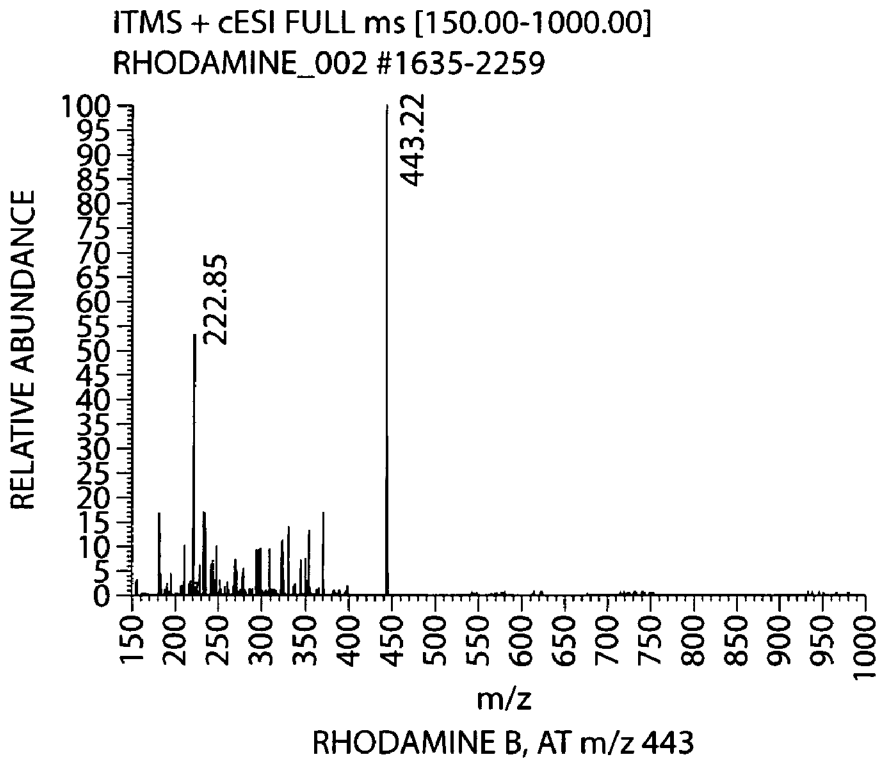
FIG. 3A is a graph of detected m/z ratios in a sample containing the quaternary immonium salt Rhodamine B.
Figure 3B:
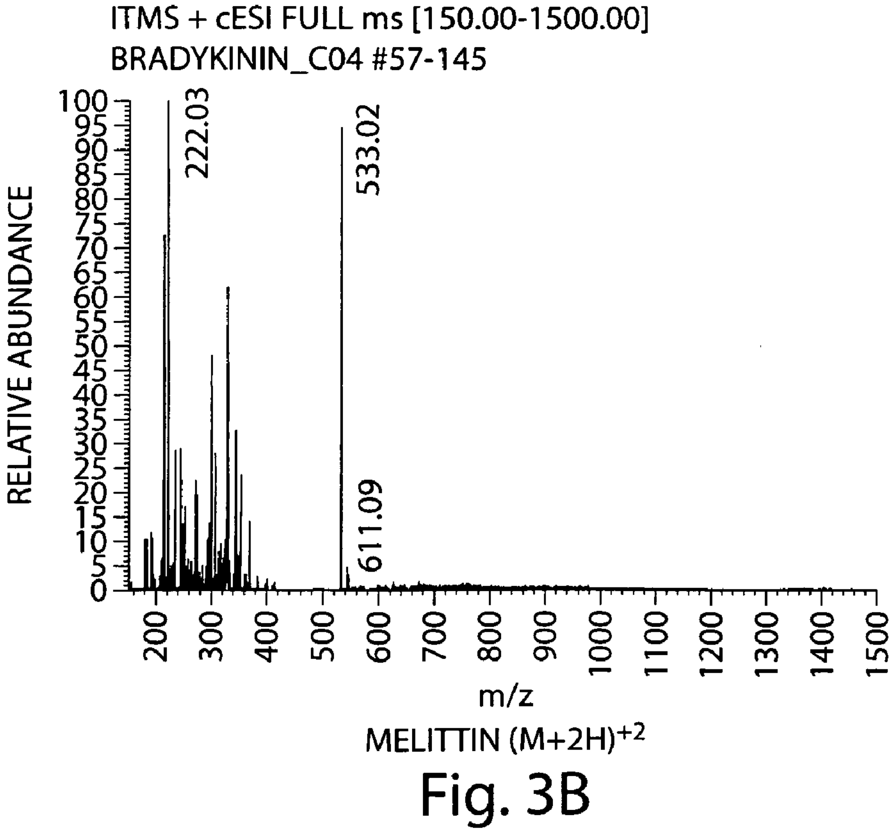
FIG. 3B is a graph of detected m/z ratios in a sample containing Bradykinin.

The analysis of two compounds obtained with the first embodiment apparatus (FIG. 1A) design is shown in FIG. 3. The first compound is a quaternary immonium salt that is commonly used as a red dye. A very stable and long lasting signal was obtained when Rhodamine B was applied to a smooth or ground glass surface. After a 20 minute+analysis (an exceptionally long time was deliberately chosen), the sample slide was exchanged for a blank glass slide and no Rhodamine carry over was detected in the DESI mass spectrum. The second compound analyzed was a small peptide, bradykinin. Similar to the electrospray analysis, a doubly charged molecular ion was observed for the peptide bradykinin by GI-DESI.

Figure 1D:
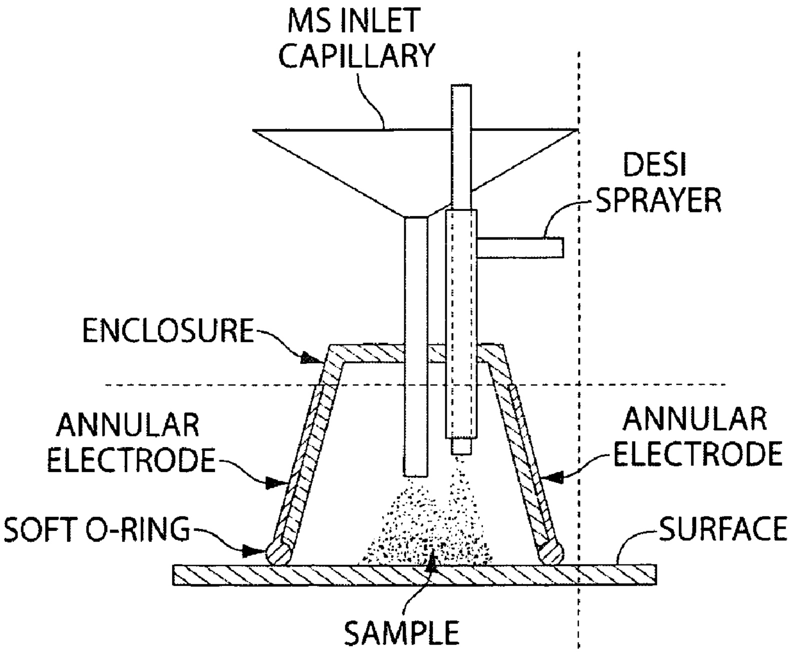
FIG. 1D is a schematic elevation view of an enclosed desorption electrospray ionization source with an internal annular electrode that can be biased at potential to direct droplets away from walls and to improve further the ion collection efficiency.
Figure 1E:
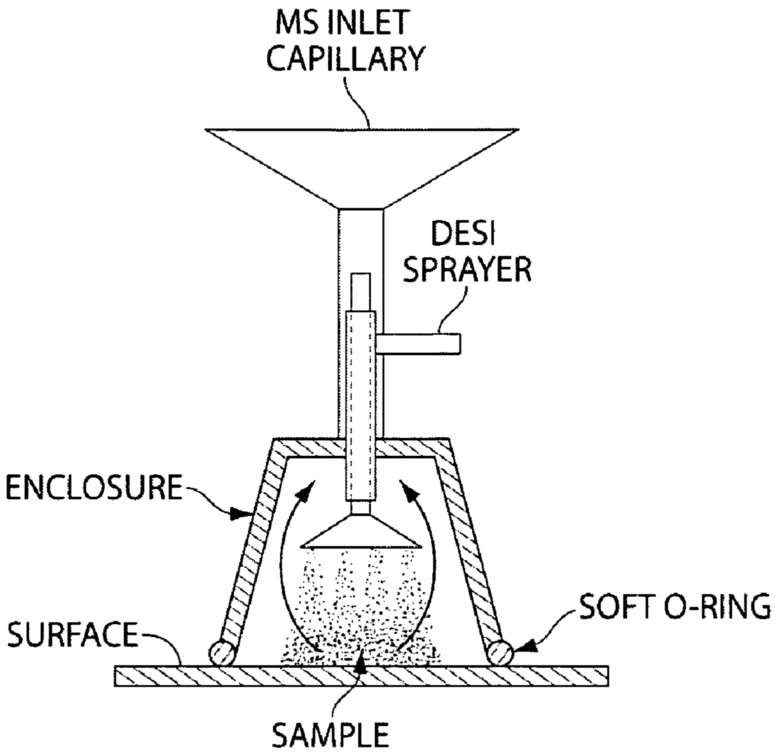
FIG. 1E is a schematic elevation view of an enclosed "garden-hose spray" geometry-independent desorption electrospray ionization source designed for increased surface coverage.
Figure 1F:
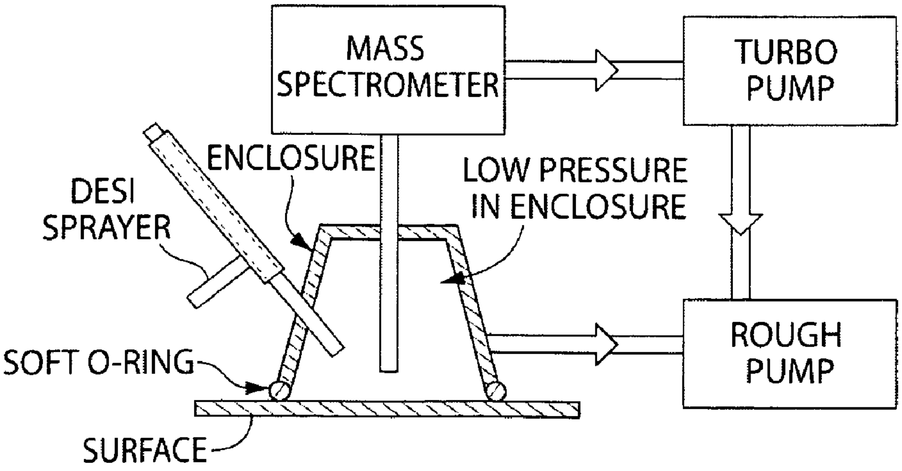
FIG. 1F is a schematic elevation view of an enclosed desorption electrospray ionization source coupled to a rough pump to reduce the pressure within the enclosure so as to remove the pumping load of the Turbo pump of a mini mass spectrometer.
Figure 2:
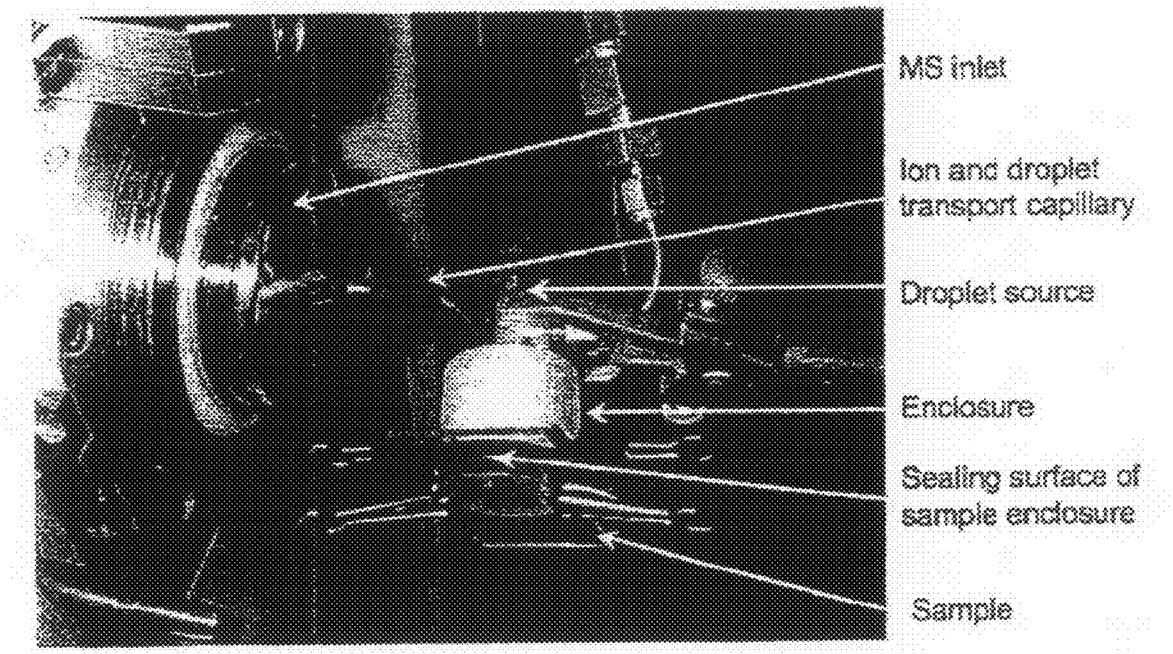
FIG. 2 is a photograph of a first enclosure and DESI device used for analysis of a Rhodamine B sample on a smooth glass surface.

FIGS. 1B through 1F show other configurations with improvements and additions to the spray chamber. As shown in the figures the enclosure allows the sprayer and mass spectrometer inlet capillary to be parallel (FIG. 1C), a feature that is useful for easy implementation of a wand for distance sampling (i.e. separation between the mass spectrometer and the sampling sprayer). The use of multiple sprayers (FIG. 1B) and a multi-spray head (FIG. 1E) to increase surface coverage is also possible. With the addition of an annular electrode one can steer droplets and ions away from (or towards) the walls of the enclosure (FIG. 1D). And the ability to manipulate the pressure inside the enclosure for example, as shown in FIG. 1F, to connect the enclosure to the rough pump of the vacuum system so as to reduce the pumping load on the turbo pump. This allows for a smaller turbo pump to be used and will be useful for the design of a miniature mass spectrometer combined with desorption electrospray ionization. This design also improves the biosafety of DESI by creating a closed system from which bioaerosols can be readily removed.

Figure 4:
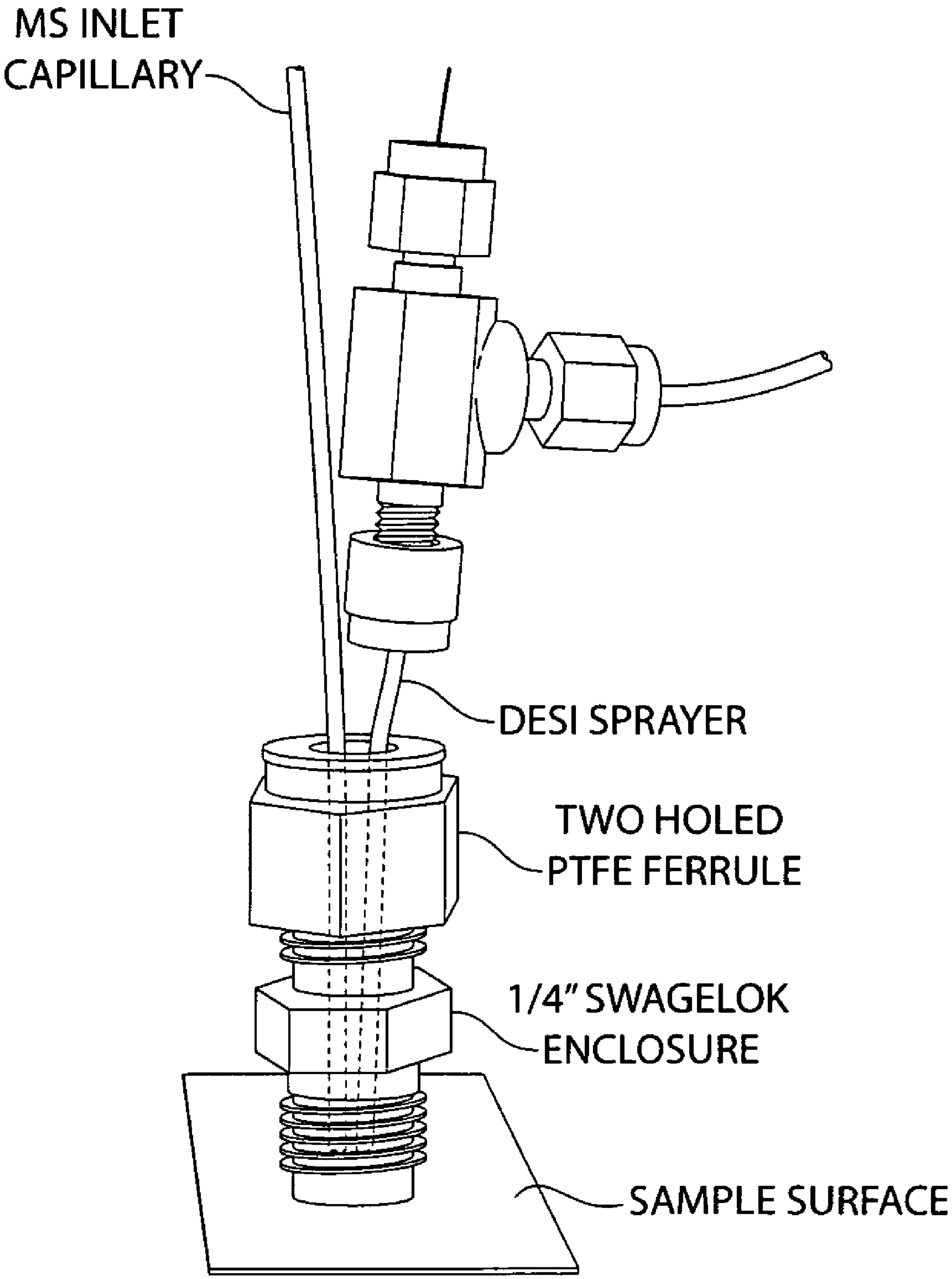
FIG. 4 is a photograph of a second enclosed DESI source with a 90° incident spray and a 90° collection angle similar to FIG. 1C.

FIG. 4 is a photograph of a second enclosed DESI source with a 90° incident spray and a 90° collection angle. The second enclosure is constructed from a stainless steel ¼-inch Swagelok® connector with a custom-made two-holed PTFE ferrule. Two 1/16" holes were drilled into a blind ¼-inch PTFE ferrule for the sprayer and spray collection capillaries, respectively. The DESI sprayer is directed perpendicularly to the surface and the collection capillary angle aligned identically to the sprayer. The DESI sprayer was constructed using a Swagelok® 1/16-inch T-piece. Briefly, the internal solvent capillary was a section of fused silica capillary tubing with an inner diameter of 50 μm and an outer diameter of 190 μm. The capillary extended through the T-piece and was connected to a syringe pump, which supplied solvent to the sprayer at 3 μl/min, unless otherwise noted. The original sprayer design was modified by replacing the 20 mm long fused silica tubing with a 50 mm long stainless steel tube (O.D.=1/16", I.D.=250 μm). This was connected through the T-piece to a nitrogen tank supply which was operated at 1380 kPa (200 psi, 35 L/min). The inner solvent capillary extended ca. 0.3 mm beyond the outer gas capillary. A potential of 5 kV was applied from the high voltage power supply of the LTQ mass spectrometer to the stainless steel needle of the solvent syringe. The sprayer was positioned 4 mm above the sample and the collection capillary extended down to about 6 mm above the surface. The standard removable MS inlet capillary of the atmospheric pressure interface of the Thermo-Fisher LTQ mass spectrometer was replaced with an extended stainless steel capillary (O.D.=1/16-inch; I.D.=0.4 mm). The total length of this capillary was 18.5 cm with 8.5 cm protruding from the instrument. This extended collection capillary was used for both the conventional and the enclosed DESI experiments. The enclosure was pressed down firmly on the surface during the combined spray sampling and ionization step. The parallel spray and collection capillaries are drawn superimposed onto the photograph to show their positions inside the enclosure. Double-sided adhesive tape was sometimes used around the edges of the enclosure to keep samples in place and to allow hands-free operation and prolonged sampling times. Comparisons between the performance of the conventional DESI source and the second geometry independent version were made using the operating conditions summarized in Table 1.

TABLE 1

Enclosed- and conventional DESI source settings used

| | Geometry independent DESI | Conventional DESI |
|---|---|---|
| Spray voltage | 5 kV | 5 kV |
| Incident angle | 90° | 50° |
| Collection angle | 90° | 10° |
| Solvent flow rate | 3 μL/min | 3 μL/min |
| Nebulizing gas flow rate | 35 L/h, 200 psi | 40 L/h, 120 psi |
| MS inlet to sample distance | 6 mm | 5 mm |
| Spray tip to surface distance | 4 mm | 2 mm |
| Capillary Voltage | 35 V | 35 V |
| Tube lens voltage | 85 V | 85 V |
| Capillary temperature | 150° C. | 150° C. |

The incident and collection angles were varied to test the reduced dependence of signal intensities on geometrical factors. In addition to the enclosure described above, (90/90), ¼-inch Swagelok® elbows were cut open to produce enclosures with (a) an incident angle of 50° and a collection angle of 10° (50/10), (b) an incident angle of 45° and a collection angle of 45° (45/45), and by removing one port of a T-piece, to produce (c) an incident angle of 90° and a collection angle of 10° (90/10). For these experiments an off-centre hole was drilled through a blank PTFE ferrule to allow the collection capillary to extend closer to the surface. (See Figures in Table 2). The influence of enclosure material, nebulizing gas pressure and flow rate and solvent flow rates were investigated. Data presented is the average of three samples individually prepared and analyzed. The average intensity of the centroided peak for Rhodamine at m/z 443.2 over ±20 scans was calculated. Intensity and spectral features were compared between the conventional DESI source and that made using the modified (90°/90°) sprayer described above.

By enclosing the spray in a small, pressure-tight chamber, all ions and vapors produced by the interaction of the spray with the surface can be drawn into the vacuum system of the mass spectrometer and vented through the exhaust of the vacuum pump, potentially increasing the signal strength and simultaneously protecting the analyst from the spray and surface materials including solvent vapors, chemicals and biological materials. The small, pressure-tight enclosure provides the advantage of the possible introduction of a reactive reagent vapor above the analyte supporting surface. The small, pressure-tight enclosure provides the additional advantage that transport into the atmospheric pressure interface of the mass spectrometer is aerodynamically assisted by the suction of the vacuum system, the mass flow of the expanding nebulizing gas and the evaporating solvent. The vacuum system of the Thermo Finnigan LTQ® mass spectrometer used in these experiments was able to handle the increased pumping load due to the direct coupling of the atmospheric pressure interface and the associated nebulizing gas and evaporating solvent vapor. While the present data was collected using a mass spectrometer, a ion mobility analyzer or other types of ion analyzer and related processing system could be employed.

After colliding with the surface, droplets as well as desorbed ions and neutral molecules are sampled into the collection capillary, irrespective of the combination of spray and collection capillary angles. This reduced dependence of signal intensity on geometric factors is summarized in Table 2 where the signal intensity for Rhodamine 6G on a glass surface for a number of different combinations of incident and collection angles are compared. The 50/10 and 90/90 configurations produced results similar to that obtained for the conventional open DESI experiment, while setting both the angles to 45° seemed to be especially beneficial. Even the geometrically and aerodynamically least favorable combination of an incident angle of 90° and a collection angle of 10° produced a strong signal. Consequently, the sprayer and inlet capillaries are not required to be fixed in a narrow range of operating angles and the observed ion intensities do not strongly depend on the combined choice of sprayer and collection angles.

TABLE 2

Influence of source geometry on signal intensity

| Configuration | Incident/Collection angle | Mean Rhodamine intensity* |
|---|---|---|
| 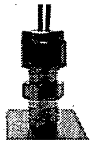 | 90°/90° | 1546 ± 630 |
| 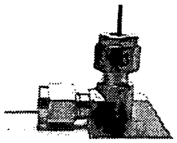 | 90°/10° | 739 ± 250 |
| 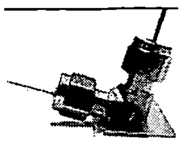 | 50°/10° | 1375 ± 510 |

TABLE 2-continued

Influence of source geometry on signal intensity

| Configuration | Incident/Collection angle | Mean Rhodamine intensity* |
|---|---|---|
|  | 45°/45° | 2974 ± 1040 |
| 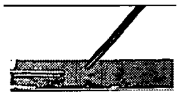 | 50°/10°(Open) | 1490 ± 525 |

*5 samples were prepared and analyzed.

Certain advantages of the 90/90 configuration are as follows: involves no special machining; easily produced from commercially available fittings and ferrules; signal is more stable than the other configurations in which occasional high intensity spikes can be observed; serves as a good case for comparison with conventional DESI as the enclosed 90/90 configuration is the most different from the optimum angles empirically established for the conventional source; easiest to incorporate into an envisioned non-proximate DESI wand for stand-off detection where the ions are effectively transported over a large distance between a physically separated DESI source and mass spectrometer; and allows for the analysis from cavities and other complex sample morphologies.

The spray potential, enclosure material, liquid and nebulizing gas volumetric flow rates are factors for the enclosed DESI experiment. Charging of the enclosure and sample surfaces may beneficially or adversely affect the transport of analyte material into the atmospheric pressure interface of the mass spectrometer. The amount of surface and enclosure charging depends on the spray current and spray potential and therefore the applied spray potential and enclosure material were studied simultaneously. The applied potential, liquid flow rate and nebulizing gas flow rate are important for analyte desorption and ionization and these were empirically optimized for the 90/90 stainless steel enclosure.

Figure 5A:
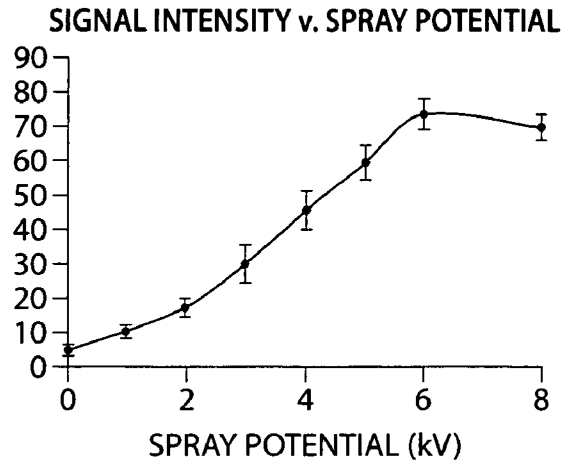
FIG. 5A shows graphically the results of Rhodamine analyzed from smooth glass surfaces using a stainless steel enclosed DESI source while increasing the spray potential from 0 to 8 kV.

FIG. 5A shows the optimization of the spray voltage for the analysis Rhodamine 6G on a smooth glass surface using an enclosure made of stainless steel. The signal intensity increased with stepwise increases from 0 to 8 kV in the applied ionization voltage. The total ion current continued to increase with applied spray potential while the signal intensity of the analyte increased steadily only up to 6 kV. The impact of the physical properties of the camber material on signal intensities and stabilities was investigated by replacing the ¼-inch SS Swagelok® connector with a similar part made of PTFE or of PFA. The choice of material did not have a strong effect on the observed signal intensity; however, the signal was less stable when PTFE and PFA enclosures were used. Charge build-up is prevented with a stainless steel enclosure through electrical contact with the inlet capillary. The collection capillary was set to 30V relative to the instrument ground. Since the stainless steel enclosure is in contact with this capillary, this will also be at an elevated voltage (relative to instrument ground) approaching the 30V on the capillary. Electrically grounding the enclosure to the casing of the mass spectrometer was also investigated but this did not change the observed signal.

The flow rate of the spray solution was increased in 1 μL/min steps from 0 to 6 μL/min using 200 psi (35 L/h) nebulizing gas pressure and the 90/90 spray configuration with the stainless steel enclosure of FIG. 5A. Maximum signal intensity was obtained at 2 μL/min, in good agreement with the optimum value previously established for the conventional open DESI experiment. However, with the enclosed geometry-independent DESI interface a further increase in solvent flow rate was detrimental to the signal intensity as is seen in FIG. 5C. Increasing solvent flow rate above the optimum for analyte desorption is believed to reduce the mean free path of ions by increasing the partial pressure of neutral molecules formed on evaporation of the excess solvent without substantially increasing desorption of analyte material from the surface. Solvent neutrals may also compete with the analyte for the available charges.

Figure 5B:
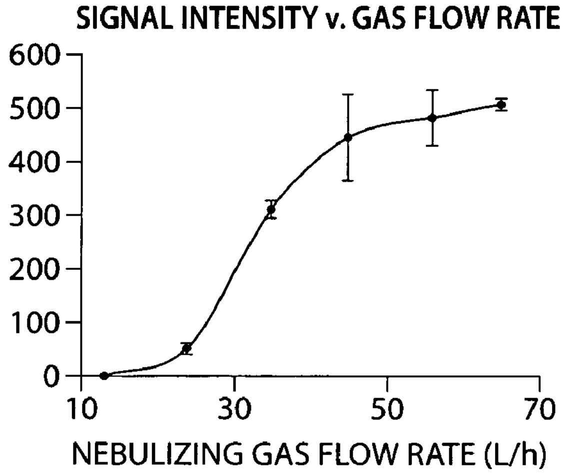
FIG. 5B shows graphically the results of the same analysis while changing the pressure at the regulator from 100 to 350 psi producing nebulizing gas flow rates of 13 to 75 L/h.
Figure 5C:
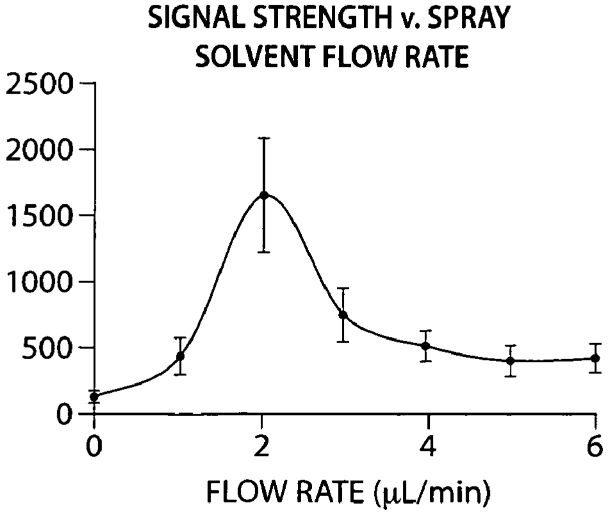
FIG. 5C shows graphically the results from increasing the spray solvent flow rate.

Similarly, as shown in FIG. 5B, changes in the signal strength with increasing nebulizing gas pressure and volumetric flow rate followed the same trend and had similar magnitudes to those obtained for conventional DESI. With a spray solution flow of 3 μL/min, used in the 90/90 spray configuration in a stainless steel enclosure, the signal increased strongly with applied pressure up to 200 psi (35 L/h). Thereafter, a further increase in pressure only moderately increased the signal. In the conventional DESI experiments, a shorter outer capillary (20 mm) is used and an optimum volumetric flow rate of 40 L/h is obtained (measured with a bubble flow meter) at ambient conditions when a typical regulator pressure of 120 psi is applied.

Mass spectra were recorded for Bombesin, a small peptide (1618 Da) and for Cytochrome C, a protein from horse heart (12000 Da) using both conventional DESI and the enclosed geometry-independent DESI source. The intensities obtained with both designs were comparable. Spectral features were also mostly similar but small differences are briefly described below. A sample containing the narcotics codeine (299 Da) and morphine (285 Da) and a tablet containing Loratidine were also analyzed.

Figure 6A:
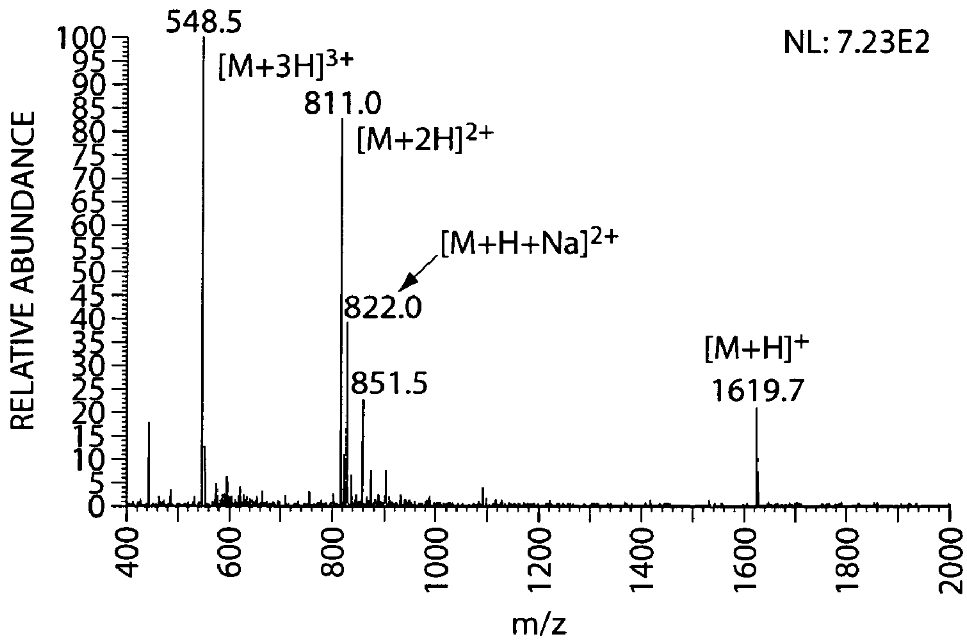
FIGS. 6A-6D show a comparison of results obtained by enclosed DESI and conventional DESI.
Figure 6B:
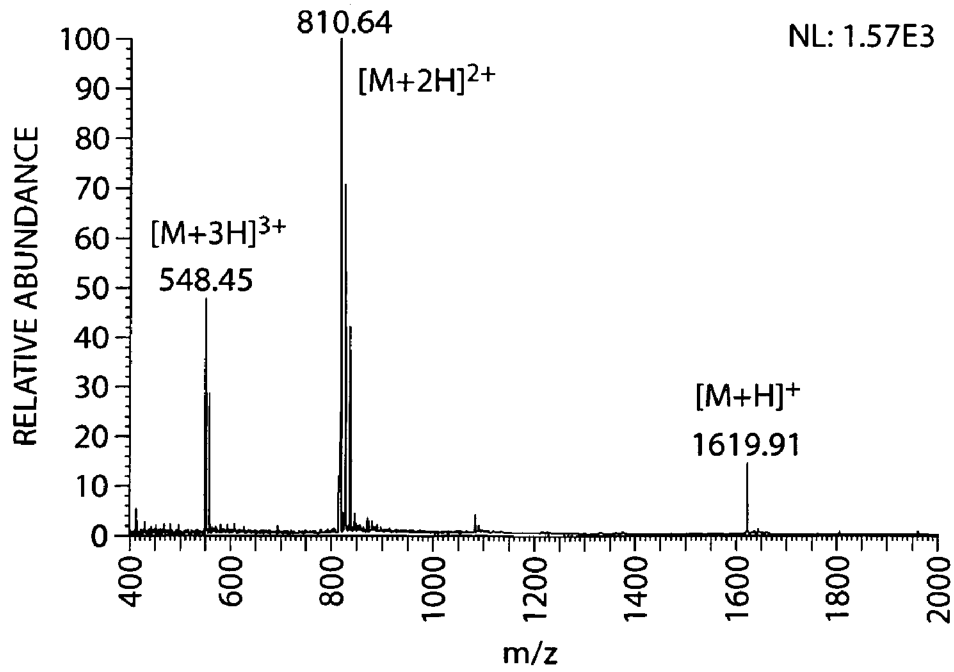
Figure 6C:
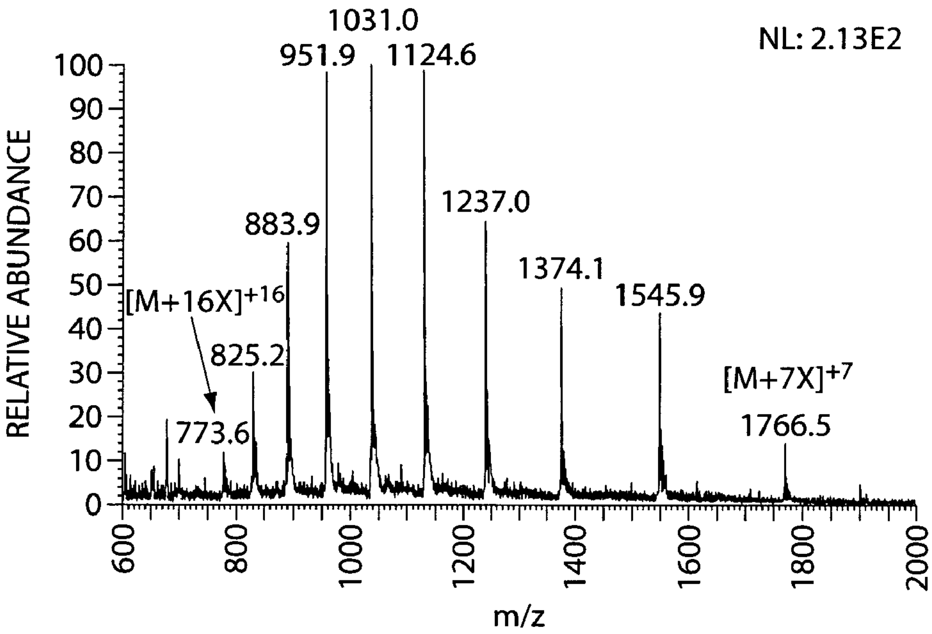
Figure 6D:
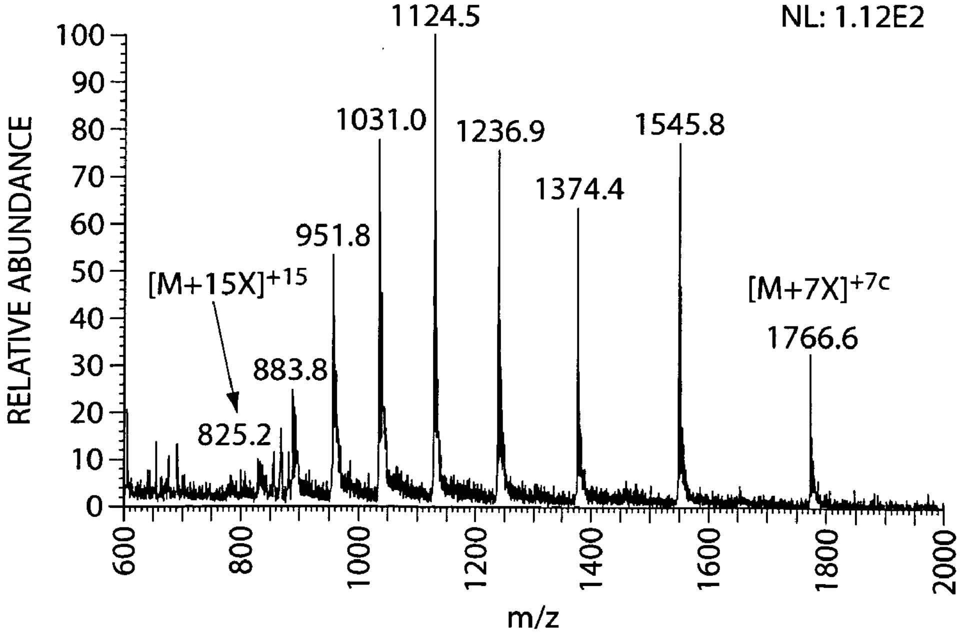

With the enclosed DESI source, shown in FIG. 6A, higher charge states were obtained for both the peptide and protein samples when compared to analysis with the open DESI source shown in FIG. 6B. Using the enclosed DESI source, the $[M+3H]^{3+}$ ion at m/z 548.5 was the base peak in the spectrum whereas the $[M+2H]^{2+}$ ion at m/z 810.6 dominates in the conventional DESI experiment. The charge envelope for Cytochrome C analyzed from PTFE was slightly shifted so that the most abundant ion is one charge state higher for the enclosed DESI source, shown in FIG. 6C, as compared to the conventional DESI experiment. The spectrum obtained with the conventional DESI source, FIG. 6D, shows a mixture of the native conformation of Cytochrome C which produces a narrow distribution around $[M+8H]^{8+}$ and $[M+9H]^{9+}$ and a partially denatured state. In ESI the denatured state typically produces an envelope with a maximum at $[M+16H]^{16+}$ Peak widths appeared to be the same for both source configurations.

Figure 7A:
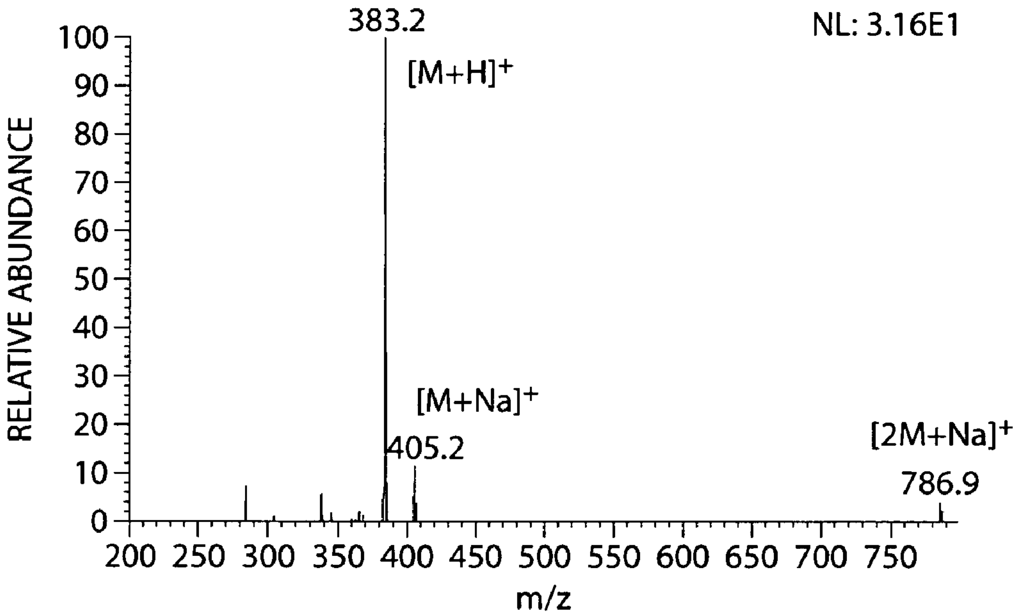
FIG. 7A-7B show the analysis of small molecule pharmaceuticals examined using the second enclosed DESI source.
Figure 7B:
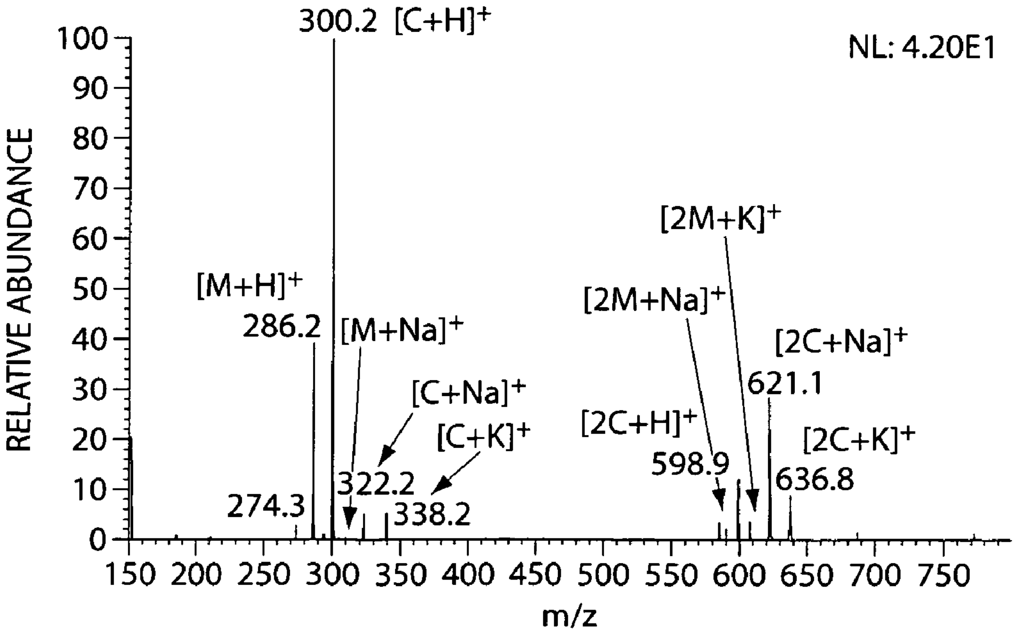

The spectra recorded for morphine and codeine showed little difference between the two configurations. Codeine, with a higher gas phase basicity, gave a larger response shown in FIG. 7B with the application of the same amount (100 pg) of material of each compound to the surface. In addition to the protonated and sodiated forms of morphine and codeine, protonated, sodiated and potassiated dimers $[2M+X]^+$, X=H, Na and K, were also observed for Codeine at m/z 599, 621 and 637 and for morphine at lower intensities at m/z 571, 593 and 609. The analysis of a Claritin® tablet shown in FIG. 7A produced the protonated ion of the active ingredient, Loratidine, at m/z 383 as well as a sodiated ion (m/z 405), and a sodiated dimer $[2M+Na]^+$ at m/z 787. Carryover was not observed except during the analysis of a previously sprayed Claritin® tablet in which large particulates from the softened tablet were ablated and contaminated the enclosure.

Figure 8:
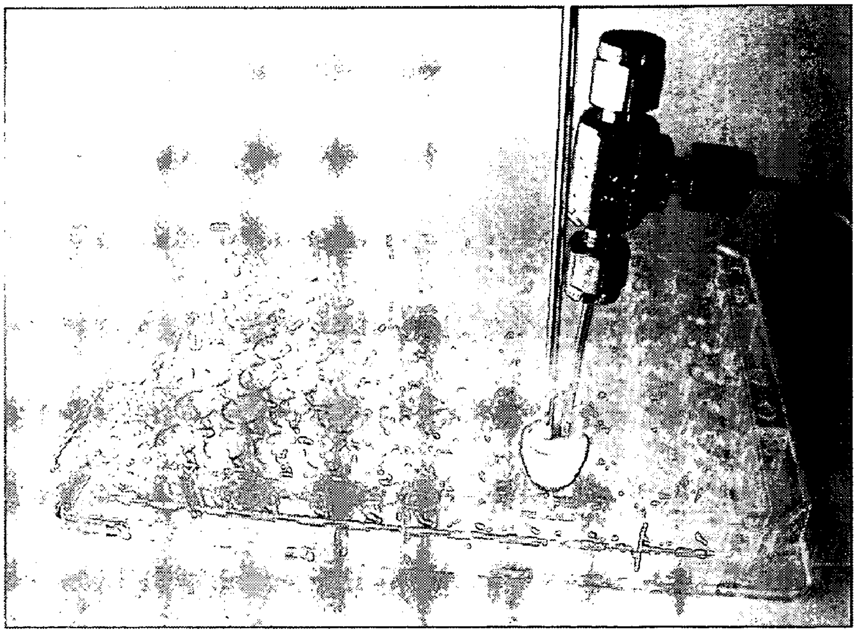
FIG. 8 shows the use of a third enclosed DESI on a micro titer plate. The plate wells form the enclosure and the ¼-inch nut and connector are removed so that the ¼-inch ferrule formed a seal against the well opening.
Figure 9:
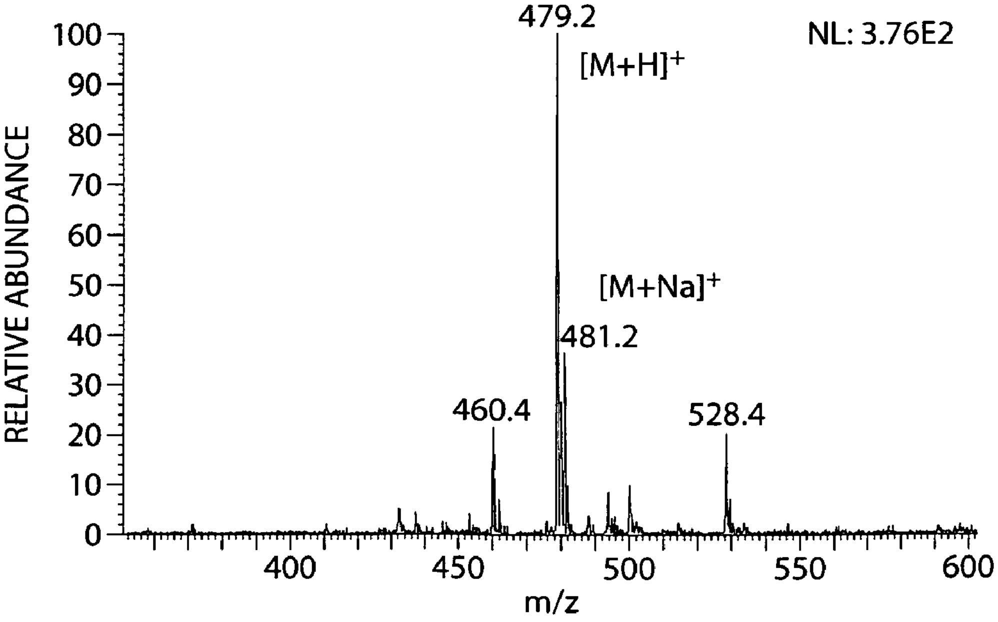
FIG. 9 shows a mass spectrum of 60 pg of chlortetracycline (m/z 479.2) from a 96-well micro titer plate using the third enclosed DESI volume formed by the end of the 90°/90° DESI probe and the well itself.

Geometry independent DESI in the enclosed source also allows the easy integration of ESI mass spectrometry with the versatile high-throughput 96-well plate format as shown in FIG. 8. The parallel and perpendicular spray and collection angles of the 90/90 configuration allow the direct analysis of the contents of dried or frozen samples from each individual well in turn. In this case the well forms its own enclosure and the ¼-inch connector was removed. A good seal was obtained with the ¼-inch PTFE ferrule directly pressed onto the well opening. This capability is demonstrated in FIG. 9 showing the analysis of 60 pg of chlortetracycline after drying 10 μL of a 6 μL/mL solution. This configuration will allow easy integration of sampling and direct analysis by DESI of 96-well plates on a high-throughput robot controlled platform.

The GI-DESI source configurations of the present invention have potential utility in the analysis of large surface areas by DESI for the detection of warfare agents and explosives, pesticides and other chemicals of relevance to human safety. The source can also be used in the analysis of chemical reactors for the presence of residues. The source also finds utility in a form of DESI called Reactive DESI where the reactions require inert or controlled atmospheres. All applications of DESI where simplifying the spray geometries is beneficial, such as mass market commercial DESI, and in miniature and portable mass spectrometers, can use the sources of the present invention. The sources have particular utility in connection with the application of DESI in environments where exposure to the solvent spray or its vapors is not acceptable. The sources allow for an extra vacuum stage around the sample to facilitate creation of adequately pumped miniature DESI-MS system.

By enclosing the DESI source in a pressure-tight enclosure, the need to optimize the geometries for different samples is removed, producing a robust interface with highly reduced dependence of signal strength on geometry. We have demonstrated that the enclosed DESI spectra obtained for compounds of a variety of types produced results with very similar intensities and spectral characteristics to those obtained for conventional DESI experiments. At the same time, enclosing the sprayer also protects the analyst from exposure to solvent vapors and toxic or infectious substances when these are present on the sample surface. The parallel and perpendicular spray and collection angles of the enclosed DESI source allow for easy and direct analysis of the contents of dried or frozen samples from standard 96-well plates. The pressure tight enclosure also enables control over the experimental atmosphere and will allow for the study of desorption ionization processes at reduced or increased pressures as well as for the use of highly reactive and potentially toxic species in reactive DESI experiments. The pressure tight enclosure could be modified to include focusing and directing electrodes for directing the DESI spray droplets to a defined spot within the enclosure.

The invention having been fully described, it is further illustrated by the following claims, which are illustrative and are not meant to be further limiting. Those skilled in the art will recognize or be able to ascertain using no more than routine experimentation, numerous equivalents to the specific procedures described herein. Such equivalents are within the scope of the present invention and claims. The contents of all references, including issued patents and published patent applications, cited throughout this application are hereby incorporated by reference.

What is claimed is:

1. Apparatus for enclosing a DESI spray, wherein the apparatus comprises an enclosure forming a chamber, enclosing within the chamber a take-off of the DESI spray into at least one instrument selected from: a mass spectrometer, an ion mobility analyzer or other type of ion analyzer, and further comprises a related processing system.

2. The apparatus of claim 1, wherein the apparatus further comprises a high pressure atmosphere within the chamber.

3. The apparatus of claim 1, wherein the DESI spray is performed in an inert atmosphere within the chamber.

4. The apparatus of claim 1, wherein the DESI spray is performed in a reduced pressure atmosphere within the chamber.

5. The apparatus of claim 1, wherein the chamber comprises a titer plate containing a plurality of wells and a cover, the cover being selectively movable relative to the plate to cover a selected well.

6. The apparatus of claim 1, further comprising a port for introduction of a reactive reagent vapor above a sample supporting surface.

7. The apparatus of claim 1, further comprising focusing and directing electrodes for directing the DESI spray to a defined spot within the enclosure.

8. The apparatus of claim 1, wherein the DESI spray and the take-off are inclined with respect to each other at an angle of between 0° and 90°.

9. The apparatus of claim 8, wherein the take-off is inclined with respect to a sample supporting surface at an angle of between 10° and 90°.

10. Method for performing DESI comprising confining incoming droplet direction and collected droplets/ions by a chamber wall located above the plane of the sample surface, wherein the method is performed in an enclosure comprising the chamber wall.

11. The method of claim 10, further comprising fixing a position and a direction of spray producing and spray sampling devices in relation to the surface to avoid any fine adjustment of position or angle.

12. The method of claim 10, wherein the direction of spray is mechanically or pneumatically altered to cover a large range of angles and areas.

13. The method of claim 10, further comprising the step of adding a high pressure gas within the chamber.

14. The method of claim 10, further comprising the step of adding an inert gas within the chamber.

15. The method of claim 14, further comprising the step of removing gas from the chamber.

16. The method of claim 10, further comprising the step of evacuating the chamber.

* * * * *